(12) United States Patent
Bekooij

(10) Patent No.: US 11,301,542 B2
(45) Date of Patent: Apr. 12, 2022

(54) METHODS AND APPARATUSES INVOLVING FAST FOURIER TRANSFORMS PROCESSING OF DATA IN A SIGNED MAGNITUDE FORM

(71) Applicant: NXP B.V., Eindhoven (NL)

(72) Inventor: Marco Jan Gerrit Bekooij, Empel (NL)

(73) Assignee: NXP B.V., Eindhoven (NL)

( * ) Notice: Subject to any disclaimer, the term of this patent is extended or adjusted under 35 U.S.C. 154(b) by 236 days.

(21) Appl. No.: 16/413,162

(22) Filed: May 15, 2019

(65) Prior Publication Data

US 2020/0364287 A1    Nov. 19, 2020

(51) Int. Cl.
G06F 17/14    (2006.01)
G06F 7/523    (2006.01)

(52) U.S. Cl.
CPC ............ G06F 17/142 (2013.01); G06F 7/523 (2013.01)

(58) Field of Classification Search
CPC ...... G06F 17/14; G06F 17/141; G06F 17/142; G06F 7/523
USPC ................................................. 708/403, 405
See application file for complete search history.

(56) References Cited

U.S. PATENT DOCUMENTS

| | | | |
|---|---|---|---|
| 4,926,371 A | 5/1990 | Vassiliadis et al. | |
| 4,991,131 A | 2/1991 | Yeh et al. | |
| 5,272,654 A * | 12/1993 | Nix | H03M 7/24 708/204 |
| 5,493,581 A * | 2/1996 | Young | H03D 7/165 375/345 |
| 6,542,539 B1 * | 4/2003 | Larsson | H03H 21/0012 375/232 |
| 6,917,955 B1 | 7/2005 | Botchev | |
| 7,865,542 B2 | 1/2011 | New et al. | |
| 2017/0083479 A1 | 3/2017 | Ahn et al. | |
| 2018/0262848 A1 | 9/2018 | Hatzianestis | |
| 2018/0278266 A1 * | 9/2018 | Ling | H03M 7/6047 |
| 2018/0341622 A1 * | 11/2018 | Chung | G06F 7/53 |

(Continued)

FOREIGN PATENT DOCUMENTS

EP    2274688 A1    1/2011

OTHER PUBLICATIONS

A. Prabaswara et al., GNU Radio Based Software-Defined FMCW Radar for Weather Surveillance Application, the 6th International Conference on Telecommunication Systems, Services, and Applications 2011, IEEE 2011 (Year: 2011).*

(Continued)

*Primary Examiner* — Emily E Larocque

(57) ABSTRACT

An apparatus includes front-end circuitry to receive radar wave signals and a fast fourier transforms (FFT) signal processor. The FFT signal processor includes multiplication logic circuitry and other logic circuitry. The FFT signal processor derives doppler information from the radar wave signals by operating on a digital stream of input data representing the radar wave signals including using the multiplication logic circuitry to perform multiplication operations on first data in the digital stream while the first data is represented in a signed magnitude form, and using the other logic circuitry to perform other mathematical operations on second data in the digital stream while the second data is represented in a two's complement form.

20 Claims, 9 Drawing Sheets

(56) References Cited

U.S. PATENT DOCUMENTS

2020/0334321 A1* 10/2020 Shibayama ........... G06F 17/142

OTHER PUBLICATIONS

Z Chen et al., S-Band Doppler Wave Radar System, remote sensing, MDPI, 2017 (Year: 2017).*
Suleymanov, S., "Design and Implementation of an FMCW Radar Signal Processing Module for Automotive Applications", Master Thesis, Retrieved from the Internet: URL: https://essay.utwente.nl/70986/1/Suleymanov_MA_EWI.pdf, Aug. 31, 2016.

* cited by examiner

METHODS AND APPARATUSES INVOLVING FAST FOURIER TRANSFORMS PROCESSING OF DATA IN A SIGNED MAGNITUDE FORM

OVERVIEW

Aspects of various embodiments are directed to apparatuses and methods involving fast fourier transforms (FFT) processing of radar wave signals using data in a signed magnitude form.

FFTs can be computed for a variety of purposes, such as for deriving a range doppler image in a Frequency Modulated Continuous Wave (FMCW) radar system. The FFT execute so called FFT-butterflies. Inside the butterflies, the input data is multiplied by constant coefficients. A large number of multiplications can be computed, as many butterflies are computed per FFT and a number of FFTs are computed for each range-doppler image. In FMCW radars, the range-doppler images are computed at a high frame rate. Although each multiplication costs a few Joules energy, there are a number of multiplication operations performed in a period of time, which can cause power dissipation. The power dissipation limits the maximum on-time of the radar during a time-interval.

These and other matters have presented challenges to efficiencies of FFT processing implementations, for a variety of applications.

SUMMARY

Various example embodiments are directed to issues such as those addressed above and/or others which may become apparent from the following disclosure concerning fast fourier transforms (FFT) processing of radar wave signals using data that is selectively represented in a signed magnitude (SM) form.

In certain example embodiments, aspects of the present disclosure involve FFT processing of radar wave signals by operating on a digital stream of input data representing the radar wave signals using multiplication logic circuitry to perform multiplication operations on first data in the digital stream represented in SM form and using other logic circuitry to perform other mathematical operations on second data in the digital stream represented in two's complement form.

In more specific example embodiments, an apparatus includes front-end circuitry that receives radar signals and an FFT signal processor. The front-end circuitry, in specific aspects, includes transceiver circuitry and a signal processor. The transceiver circuitry is arranged with an antenna to output signals and to receive the radar wave signals indicative of reflections from the output signals. The signal processor, which includes an analog-to-digital converter (ADC), mixes the output signal with the radar wave signals and generates the digital stream of input data from the mixture. The FFT signal processor includes multiplication logic circuitry and other logic circuitry and is configured to derive doppler information from the radar wave signals by operating on the digital stream of input data representing the radar wave signals. The FFT signal processor derives the doppler information using the multiplication logic circuitry to perform multiplication operations on first data in the digital stream while the first data is represented in a SM form and using the other logic circuitry to perform other mathematical operations on second data in the digital stream while the second data is represented in a two's complement form. In more specific aspects, the FFT signal processor converts the first data between the two's complement form and the SM form. The multiplication logic circuitry and other logic circuitry optimize power consumption by at least ten percent relative to the other logic circuitry performing the multiplication operations on the first data while the first data is represented in the two's complement form.

The multiplication logic circuitry can include multiplier circuitry to perform the multiplication operations on the first data while the first data is represented in the SM form. The multiplier circuitry, in various embodiments, includes multiplication array circuitry and/or a multiplier array that performs the multiplication operations on the first data, while represented in the SM form, and that adds together outputs from the multiplication operations. In other embodiments, the multiplier circuitry includes two both multiplier circuits and an adder circuit that performs the multiplication operations on the first data, while represented in the SM form, and that adds together outputs from the multiplication operations.

In a number of related and more-specific aspects, the multiplication logic circuitry includes a two's complement converter circuit to selectively convert the first data in the digital stream from the two's complement form to the SM form. For example, the multiplication logic circuitry includes a SM converter circuit to convert output data from the multiplication operations from the SM form to the two's complement form. In other embodiments and/or in addition, the multiplication logic circuitry includes a two's complement converter circuit to convert the first data from the two's complement form to the SM form.

In other related aspects, the other logic circuitry performs addition operations on the second data while the second data is represented in the two's complement form. In such aspects, the other logic circuitry includes addition logic circuitry. In more specific and related aspects, the other logic circuitry can alternatively and/or additionally include another multiplication logic circuitry to perform multiplication operations on the first data while the first data is represented in the two's complement form, such as when the input data has an amplitude above a threshold as further described herein.

The FFT signal processor can thereby include at least two types of computation paths. The multiplication logic circuitry is arranged along or otherwise associated with one of the at least two types of computation paths and the other logic circuitry is arranged along or otherwise associated with the other of the at least two types of computation paths. In various specific aspects, the power consumption of the FFT signal processor is dependent on the amplitude of the digital stream of input data, with the FFT signal processor consuming lower power when the amplitude of the input data is below a threshold compared to when the amplitude is above the threshold.

While certain examples are advantaged by not requiring logic circuitry to select providing the first data and the second data along different computation paths, in some specific and related examples, the FFT signal processor can determine an amplitude of the input data, and in response to the amplitude being above or below the threshold, can selectively provide the first data and the second data along different computation paths. In such alternative examples, the FFT signal processor determines whether an amplitude of the digital stream of input data is above a threshold and, in response, selectively provides the second data along a second of at least two types of computation paths associated with the other logic circuitry and provides the first data along a third of the at least two types of computation paths associated with the other logic circuitry, wherein the multiplication logic circuitry is configured along a first of the at least two types of computation paths. The other logic circuitry, in such aspects, includes the addition logic circuitry and the other multiplication logic circuitry. Again, not all embodiments are so limited, and aspects are directed to FFT signal processors that may not include selection logic that distributes input values along different computation paths.

In another specific example embodiment, an apparatus includes front-end circuitry to receive radar waves and the FFT signal processor including multiplication logic circuitry and addition logic circuitry. The FFT signal processor derives Doppler information from radar wave signals by operating on a digital input stream in input data representing the radar wave including using the multiplication logic circuitry to perform multiplication operations on first data in the digital stream while the first data is represented in a SM form, and using the addition logic circuitry to perform addition operations on second data in the digital stream while the second data is represented in a two's complement form.

The multiplication logic circuitry can further include a SM converter circuit to convert output data from the multiplication operations from the SM form to the two's complement form and/or a two's complement converter circuit to convert the first data from the two's complement form to the SM form.

The FFT signal processor can further include another multiplication logic circuitry to perform multiplication operations on the first data while the first data is represented in the two's complement form in response to the digital stream of input data having an amplitude that is above a threshold. The FFT signal processor can determine an amplitude of the digital stream, and in response, selectively provide the first data to one of the multiplication logic circuitry and the other multiplication logic circuitry based on the amplitude. In various specific aspects, the amplitudes are characterized using 24 bits. In certain examples, 8 bits may be used for the multiplier that multiples the least significant 8 bits and another multipliers that multiples the most significant 16 bits. The Twiddle coefficients are the other input and/or output of the multipliers and have 24 bits.

Other embodiments are directed to methods of using the above-described apparatuses. An example method includes receiving, by front-end circuitry of an apparatus, radar wave signals, and deriving, by a FFT signal processor, doppler information from the radar wave signals. The doppler information is derived by operating on a digital stream of input data representing the radar wave signals including performing multiplication operations, using multiplication logic circuitry of the FFT signal processor, on first data in the digital stream while the first data is represented in a SM form, and performing other mathematical operations, using other logic circuitry of the FFT signal processor, on second data in the digital stream while the second data is represented in a two's complement form. The method can further include converting the first data from the two's complement form to the SM form and converting an output of the performed multiplication operations from the SM form to the two's complement form. Performing the multiplication operations includes using a booth multiplier or another multiplier type to perform the multiplication operations on the first data while the first data is represented in the signed magnitude form and adding together outputs from the multiplication operations.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
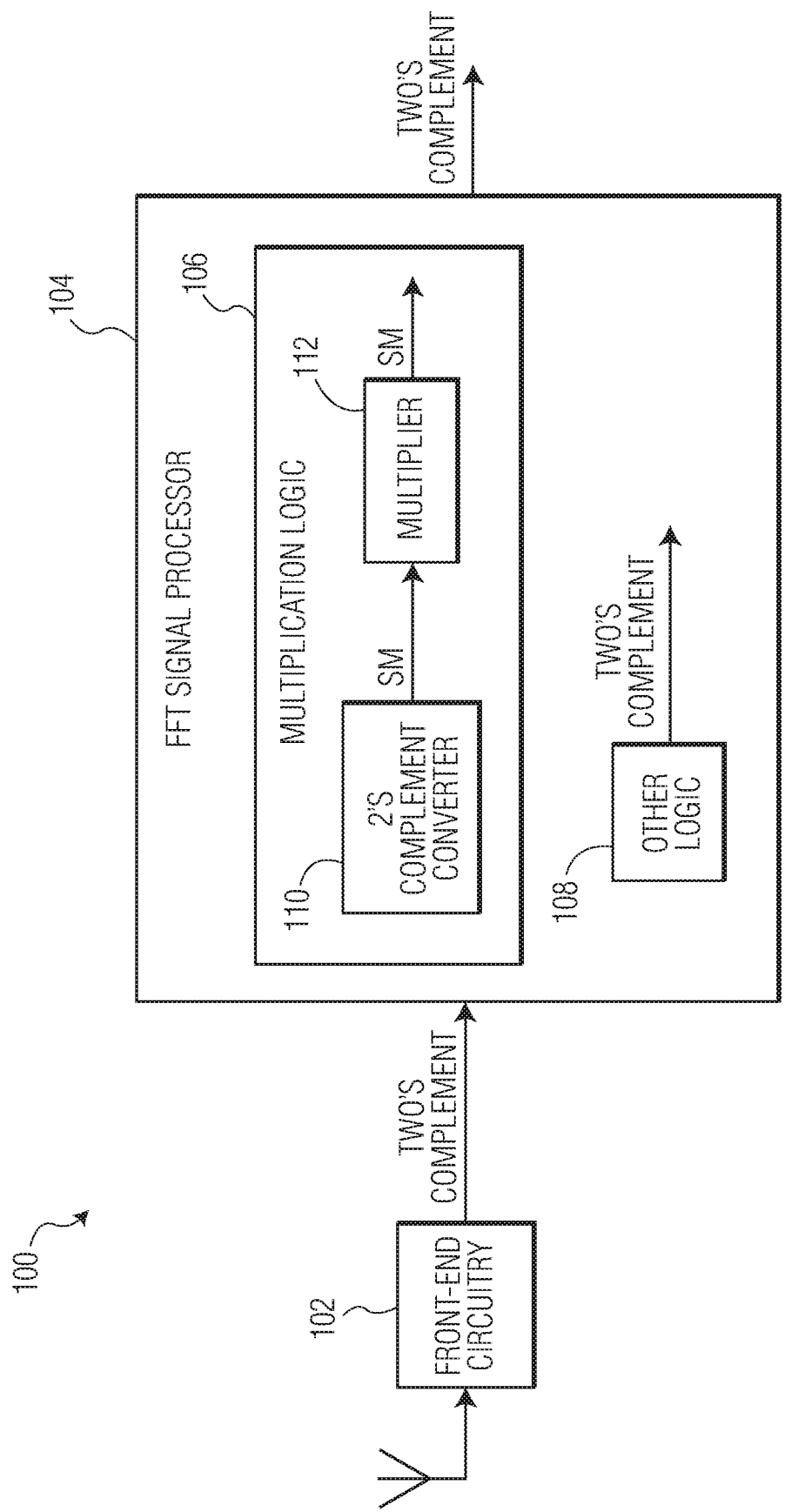
FIG. 1 illustrates an example apparatus including a fast fourier transforms (FFT) signal processor in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving fast fourier transforms (FFT) processing of radar wave signals using data that is selectively represented in a signed magnitude (SM) form. In certain implementations, aspects of the present disclosure have been shown to be beneficial when used in the context of FFT processing of radar wave signals by operating on a digital stream of input data using multiplication logic circuitry to perform multiplication operations on first data in the digital stream represented in SM form and using other logic circuitry to perform other mathematical operations on second data in the digital stream represented in two's complement. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

FFTs can be computed for a variety of purposes, such as for deriving a range doppler image in a Frequency Modulated Continuous Wave (FMCW) radar system. FMCW radar systems typically have two or more FFTs, one for range and the other for velocity estimations of targets. In some embodiments, FMCW radar systems can have a third FFT that is computed for each range-doppler bin in the two-dimensional spectrum to obtain an angle of arrival of the signal. This third FFT can have a size of the number of virtual antennas. The FMCW system can operate by a timing engine generating a periodic start signal. After each start signal, a transmitter (TX) produces a frequency ramp, e.g., a sinusoidal wave signal with a linearly increasing frequency signal (a chirp) between e.g. 75 and 76 GHz. This signal is propagated to the antenna and transmitted. The transmitted signal is reflected by the targets and picked up by the receiver (RX) antenna after it is down-mixed in the RX front-end circuitry. As radio waves travel at the speed of light and the target is at a certain distance, there is a time delay between the signal transmitted and the one received. After mixing of the received signal with the transmitted signal, the time delay results in a sinusoidal wave signal with a particular frequency. This signal is called the beat signal. After sampling of this beat signal by an analog-to-digital converter (ADC) it is further processed in the digital domain using a number of steps. The first step is computing a range FFT on the samples of each chirp. The resulting FFT output contains peaks if targets are present at different distances (e.g., ranges). The results of a number (e.g. 256) of range FFTs are stored in rows a memory. After 256 range FFT results are stored in memory, the matrix with data in the memory is transposed. After transposition again FFTs are computed, which are velocity FFTs, over each row with 256 results. The results of the velocity FFTs are again stored in memory. The resulting data matrix is called the range doppler map because it contains range and doppler information about the targets. The range doppler map is processed and the peaks are identified as targets and a target list is generated as output of the FMCW radar-system. Embodiments in accordance with the present disclosure include FFT processing related to the computation in the range FFT and/or velocity FFT that includes selectively performing multiplication operations on input data represented in a SM form, such that there are reductions in power consumption and/or an increase in maximum on-time compared to performing the multiplication operations on the input data in a two's complement form. In specific embodiments, the reduction in power is responsive to one of the input operands being below a threshold size. This can occur during FMCW radar signal processing because most output bins of the so-called range FFT tend to contain noise with an amplitude below a threshold. For the so-called velocity FFT, which takes as input the results of the range FFT, the FFT input is typically noise with a low amplitude.

FFTs execute butterflies in which inside the butterflies, the input data is multiplied by constant coefficients. In a butterfly, the fixed-point multiplication is computed with a certain absolute accuracy. If one of the operands a of the multiplier is small then the number of bits used to represent the other b operand can be reduced. Reduction of the number of bits of b is equal to making more least-significant-bits (lsb's) of b equal to zero. As many of the input values a are small, then the lsb's of b do not change most of the clock-cycles. If these bits do not change, a significant part of the multiplier hardware gates have constant inputs and do not dissipate any dynamic power. A number of embodiments further improve upon this discovery by making use of the SM number representation. In this representation, for small numbers, except the sign bit, the most-significant bits (msb's) equal zero. This is independent from whether the number is positive or negative. As a result, only a very small part of the multiplier hardware receives changing input bits and as a results dissipates dynamic power. For the so-called array-multiplier, the amount of active hardware cells in the multiplier scales quadratic in the number of non-constant bits of both operands. Addition, with the SM number representation, truncation introduces a symmetric error whereas for the two's complement representation, an additional rounding operation is used to achieve this.

The benefits of the approach is larger when a decimation-in-frequency (DIF) FFT is applied instead of decimation-in-time (DIT) FFT. The reason is that a DIF FFT splits the input data in different frequency bands already during the first FFT stage. As a result, it is the case that given a sinusoidal wave at the input of the FFT, half of the remaining butterflies in the subsequent FFT stage can already receive input signals that have a zero (or extremely small) magnitude.

In a number of embodiments, an apparatus includes front-end circuitry and an FFT signal processor. The front-end circuitry receives radar wave signals (e.g., response to output radar wave signals). The FFT signal processor includes multiplication logic circuitry and other logic circuitry. The FFT signal processor derives doppler information from the radar wave signals by operating on a digital stream of the input data representing the radar wave signal. For example, the FFT signal processor uses the multiplication logic circuitry to perform multiplication operations on first data in the digital stream while the first data is represented in SM form. The FFT signal processor uses the other logic circuitry to perform other mathematical operations on second data in the digital stream while the second data is represented in two's complement form.

A number of embodiments are directed to the above described apparatus in which the other logic circuitry includes addition logic circuitry. In such embodiments, the FFT signal processor operates on the digital stream of input data by using the multiplication logic circuitry to perform multiplication operations on first data in the digital stream while the first data is represented in the SM form, and by using the addition logic circuitry to perform addition operations on second data in the digital stream while the second data is represented in a two's complement form. The multiplication logic circuitry can optionally include an SM converter circuit to convert output data from the multiplication operations from the SM form to the two's complement form and/or a two's complement converter circuit to convert the first data from the two's complement form to the SM form.

The FFT signal processor, in specific and related embodiments, further includes another multiplication logic circuitry to perform multiplication operations on the first data while the first data is represented in the two's complement form in response to the digital stream having an amplitude that is above a threshold. The FFT signal processor can determine an amplitude of the digital stream, and in response, selectively provide the first data to one of the multiplication logic circuitry and the other multiplication logic circuitry based on the amplitude.

Various embodiments are directed to methods of using the above-described apparatuses to perform the mathematical operations on radar wave data, and to provide range-doppler images, such example method embodiments as further described herein.

Turning now to the figures, FIG. 1 illustrates an example apparatus including a FFT signal processor in accordance with the present disclosure. The apparatus 100 can include or form part of a FMCW radar system used to derive doppler information, such as radar images of targets. As illustrated, the apparatus 100 includes front-end circuitry 102 and an FFT signal processor 104.

The front-end circuitry 102 receives radar wave signals. The front-end circuitry 102 includes transceiver circuitry and signal processor. The transceiver circuitry transceiver circuitry is arranged with an antenna to output signals and to receive the radar wave signals indicative of reflections from the output signals. The signal processor is configured and arranged with the transceiver circuitry to mix the output signals with the radar wave signals and to generate the digital stream of input data from the mixture. The signal processor can include an ADC and a timing circuit. In specific embodiments, the front-end circuitry can include a TX, RX, one or more antennas, a timing circuit and/or an ADC, as further described herein. As illustrated, the digital stream input to the FFT signal processor 104 is represented in two's complement form, in accordance with various embodiments.

The FFT signal processor 104 derives doppler information from the radar wave signals by operating on the digital stream of input data. As shown, the FFT signal processor 104 includes multiplication logic circuitry 106 and other logic circuitry 108. The FFT signal processor 104 uses the multiplication logic circuitry 106 to perform multiplication operations on first data in the digital stream while the first data is represented in a SM form and uses the other logic circuitry 108 to perform other mathematical operations on second data in the digital stream while the second data is represented in a two's complement form.

In specific embodiments, the multiplication logic circuitry 106 includes multiplier logic 112 to perform the multiplication operations on the first data while the first data is represented in the SM form. The multiplier logic 112 can include multiplication array circuitry. The multiplication array circuit includes a multiplier array and is configured and arranged to perform the multiplication operations on the first data while the first data is represented in the signed magnitude form and to add together outputs from the multiplication operations. In other embodiments, the multiplier logic 112 includes two booth multiplier circuits and an adder circuit, as further described herein.

In various embodiments, the multiplication logic circuitry 106 additionally includes a two's complement converter circuit 110 that operates to selectively convert the first data in the digital stream from the two's complement form to the SM form. Although not illustrated by FIG. 1, in various embodiments, the multiplication logic circuitry 106 and/or the FFT signal processor 104 further includes a SM converter circuit that converts output data from the multiplication operations from the SM form to the two's complement form.

The other logic circuitry 108 includes logic to perform the other mathematical operations on the second data. In related embodiments, the other logic circuitry 108 performs addition operations on the second data while the second data is represented in the two's complement form. For example, the other logic circuitry 108 includes addition logic circuitry that performs the addition operations on the second data while the second data is represented in the two's complement form. In more specific and related embodiments, the other logic circuitry 108 further includes another multiplication logic circuitry that performs multiplication operations on the first data while the first data is represented in the two's complement form.

In accordance with the above-described embodiments, the FFT signal processor 104 includes at least two types of computation paths. One of the computations is associated with blocks 110 and 112 and the other computation path is associated with block 108. The multiplication logic circuitry 106 is configured along one of the at least two types of computation paths and other logic circuitry 108 is configured along the other of the at least two types of computation paths. In a number of embodiments, the power consumption of the FFT signal processor 104 is dependent on an amplitude of the digital stream of input data. The FFT signal processor 104 converts the first data between the two's complement form and the SM form, and the multiplication logic circuitry 106 and other logic circuitry 108 optimize power consumption by at least ten percent (e.g., 20 percent less) relative to the other logic circuitry 108 performing the multiplication operations on the first data while the first data is represented in the two's complement form. In various embodiments, the FFT signal processor 104 can determine an amplitude of the input digital stream, and selectively provide data along computation paths in response to the amplitude being above or below a threshold, as further described herein. In various embodiments, the multiplication logic circuitry 106 is a radix-2 FFT butterfly that performs a complex multiplication consisting of four real-valued multipliers. Each of the multipliers has an input(s) that is in SM form and the results of each of the four real-valued multipliers is added or subtracted after it is converted from SM form into a two's complement form.

Figure 2:
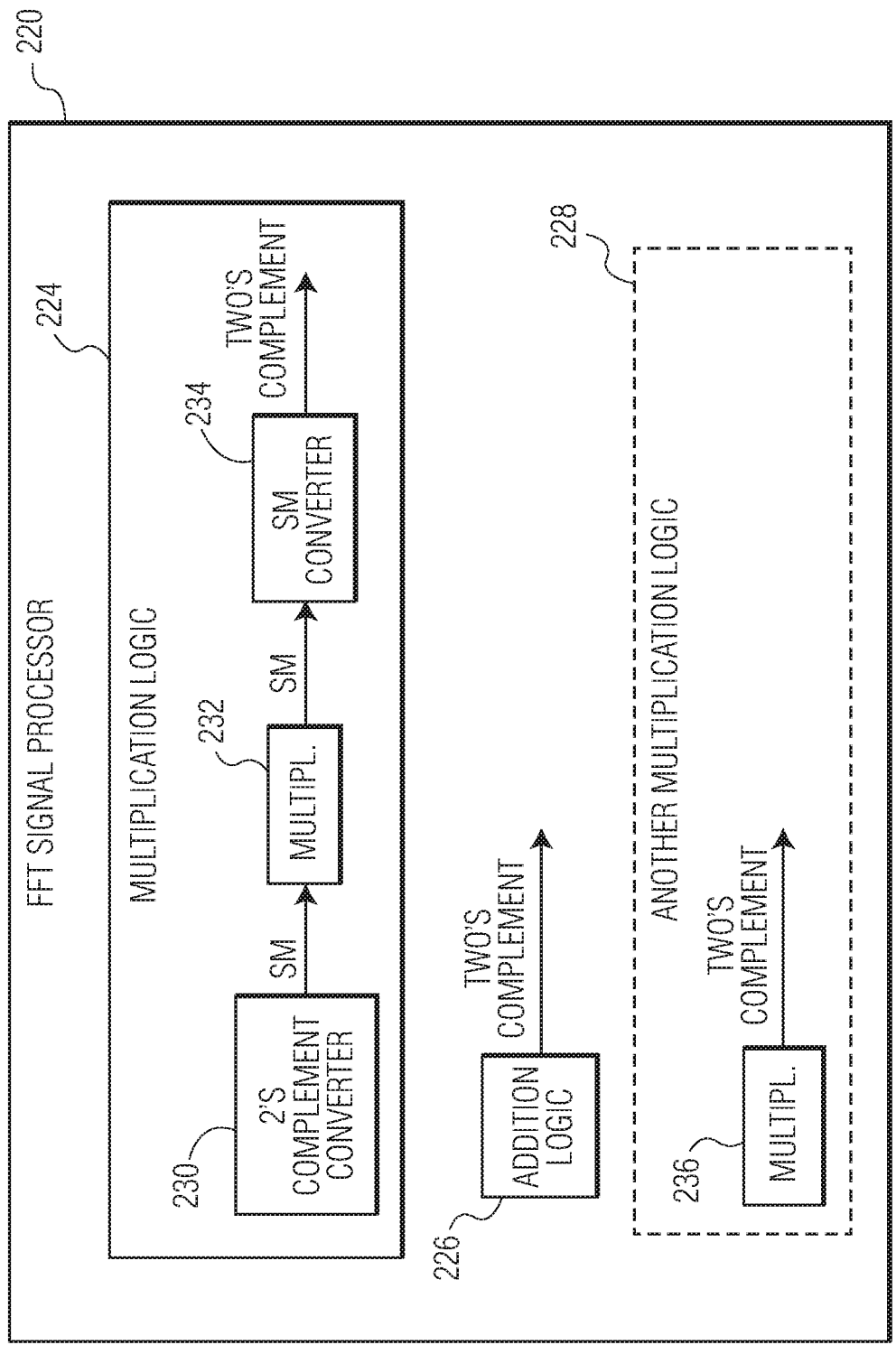
FIG. 2 illustrates an example FFT signal processor, in accordance with the present disclosure.

FIG. 2 illustrates an example FFT signal processor, in accordance with the present disclosure. The FFT signal processor 220 illustrated by FIG. 2 can include the previously described FFT signal processor 104 illustrated by FIG. 1 and having other logic circuitry that includes addition logic circuitry 226, and optionally, an additional, e.g., other, multiplication logic circuitry 228.

Similarly to FIG. 1, the FFT signal processor 220 includes multiplication logic circuitry 224 and other logic circuitry. The multiplication logic circuitry 224 includes multiplier logic 232 configured to perform multiplication operations on data while the data is represented in a SM form. The multiplier logic 232 can include one or more multiplier arrays and/or booth multipliers, as further described herein. The multiplication logic circuitry 224 can further include the two's complement converter circuitry 230 and/or the SM converter circuitry 234. The other logic circuitry includes addition logic circuitry 226 that performs addition operations on second data in the digital stream while the second data is represented in a two's complement form. Although the multiplication logic circuitry 224 illustrates one input in the SM form, embodiments are not so limited, and the multiplication logic circuitry 224 may include another input in SM form (e.g., twiddle coefficients), such that the output of the multiplication logic circuitry 224 is in SM form.

In various embodiments, the other logic circuitry further includes another multiplication logic circuitry 228. The other multiplication logic circuitry 228 includes multiplier logic 236 configured to perform multiplication operations on the first data while the first data is represented in the two's complement form. The multiplier logic 236 can include one or more multiplier arrays and/or booth multipliers.

As described above, in some specific embodiments, the computation path of the first data can depend on the amplitude of the digital stream of input data. For example, the other multiplication logic circuitry 228 can be used to perform multiplication operations on the first data while the first data is represented in the two's complement form in response to the digital stream having an amplitude that is above a threshold. Embodiments are not limited to use of the other multiplication logic circuitry 228 and can include use of the multiplication logic circuitry 224 only.

In specific embodiments, the FFT signal processor 220 determines the amplitude of the digital stream of input data and selectively provides the first data to one of the multiplication logic circuitry 224 and the other multiplication logic circuitry 228. In such embodiments, the FFT signal processor 220, based on the amplitude, provides data along one of at least two types of computation paths based on the amplitude. For example, in response to the FFT signal processor 220 determining an amplitude of the digital stream of input data is below a threshold, the FFT signal processor 220 selectively provides the first data along a first of at least two types of computation paths associated with the multiplication logic circuitry 224 and provides the second data along the second of the at least two types of computation paths associated with the other logic circuitry, namely the addition logic circuitry 226. In response to the FFT signal processor 220 determining the amplitude of the digital stream of input data is above the threshold, the FFT signal processor 220 selectively provides the second data along the second of at least two types of computation paths associated with the other logic circuitry (e.g., the addition logic circuitry 226) and provides the first data along a third of the at least two types of computation paths associated with the other logic circuitry, e.g., the other multiplication logic circuitry 228. In such embodiments, the FFT signal processor 220 can include selection logic used to distribute input data along different computation paths.

As noted above, embodiments are not limited to use of selection logic to distribute data along different computation paths. In the SM form, small negative numbers have leading zeros of their most significant bits like also positive numbers have. As a result, the inputs of the two multipliers is zero and all internal partial product results inside the multiplier are also zero. This holds for the typically used booth multiplier even though the booth multiplier generates an internal negative number from positive input numbers because the negative version of zero is equal to zero, e.g., negative zero equals zero.

Figure 3A:
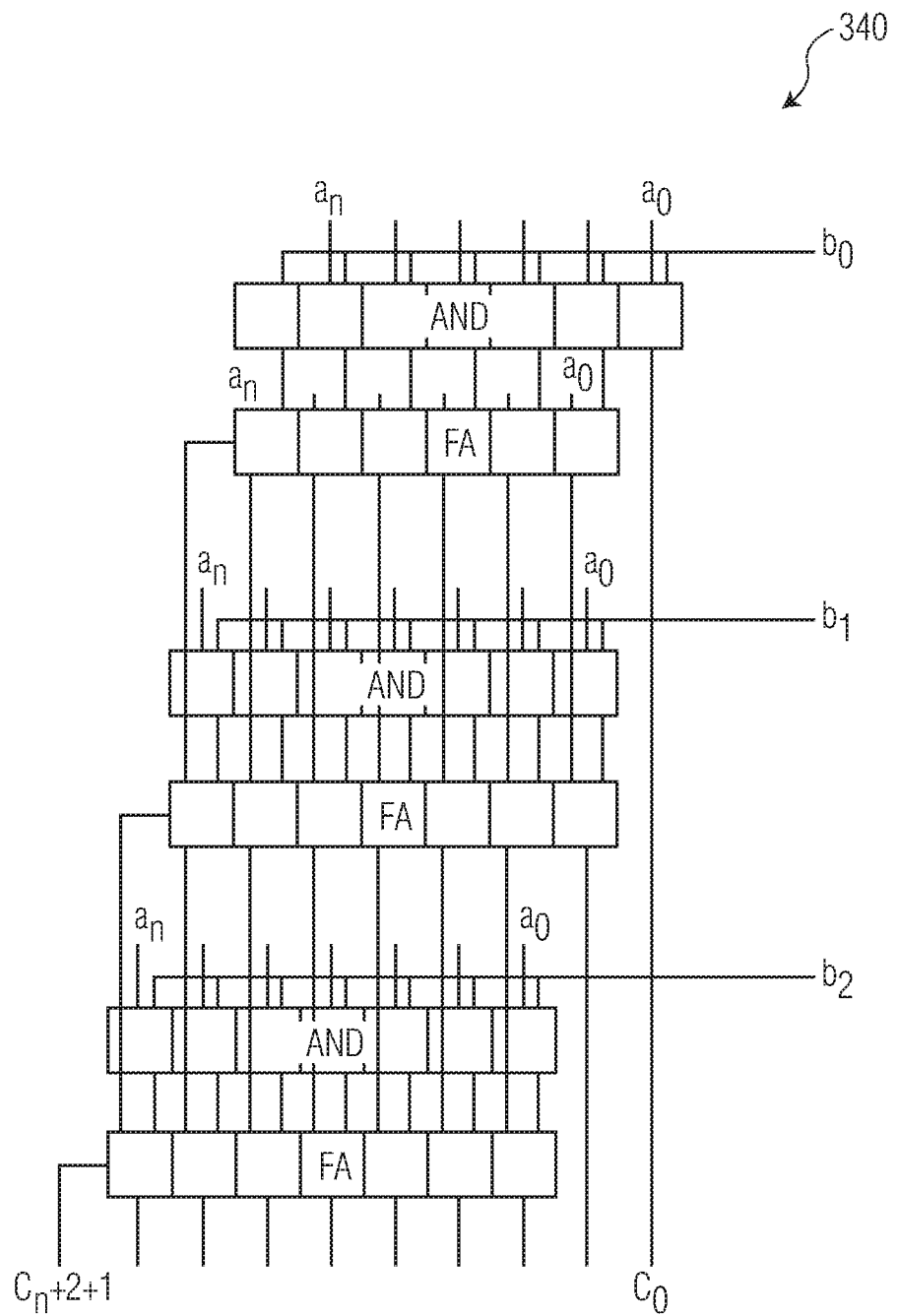
FIGS. 3A-3C illustrate example multiplication logic circuitry, in accordance with the present disclosure.
Figure 3B:
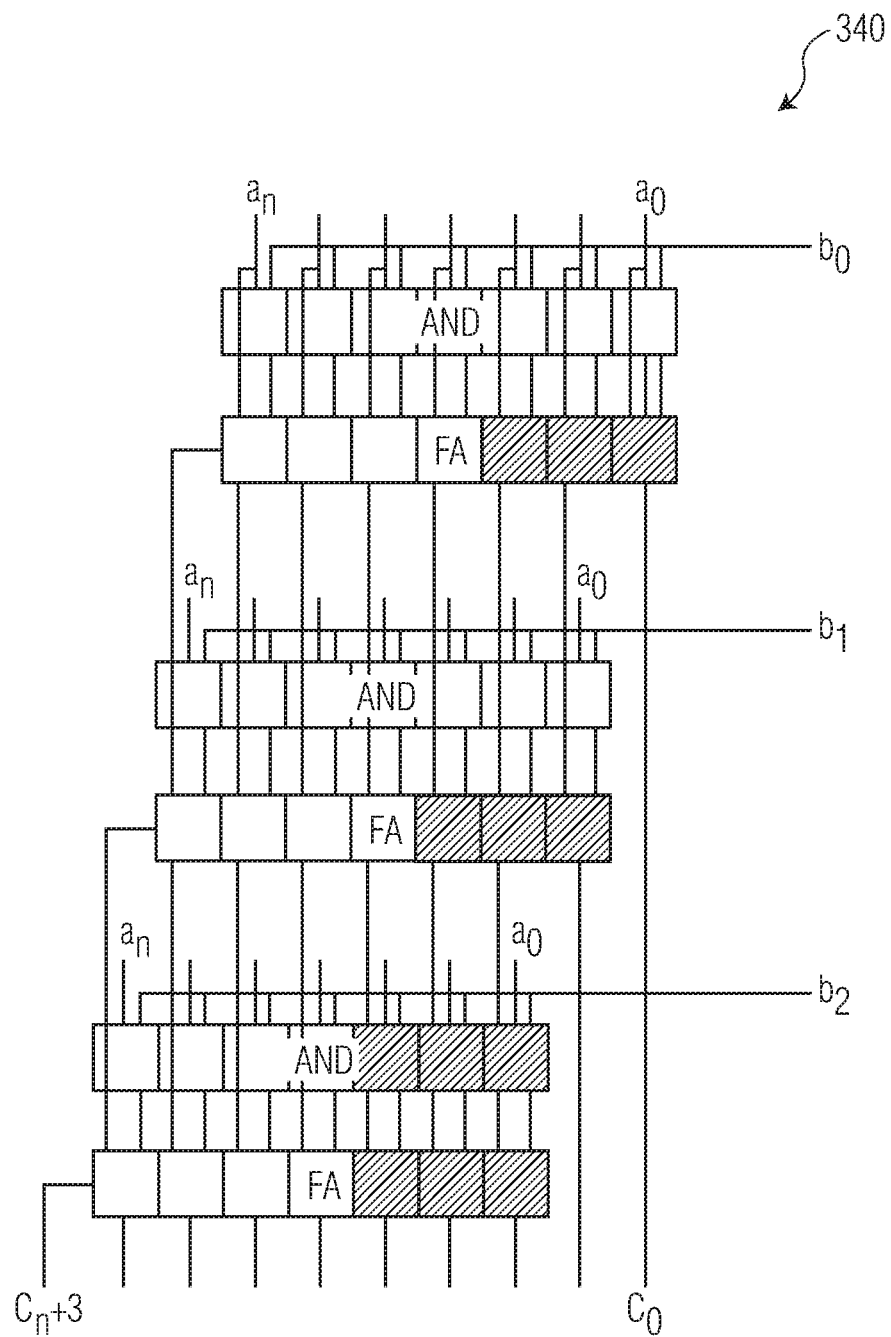
Figure 3C:
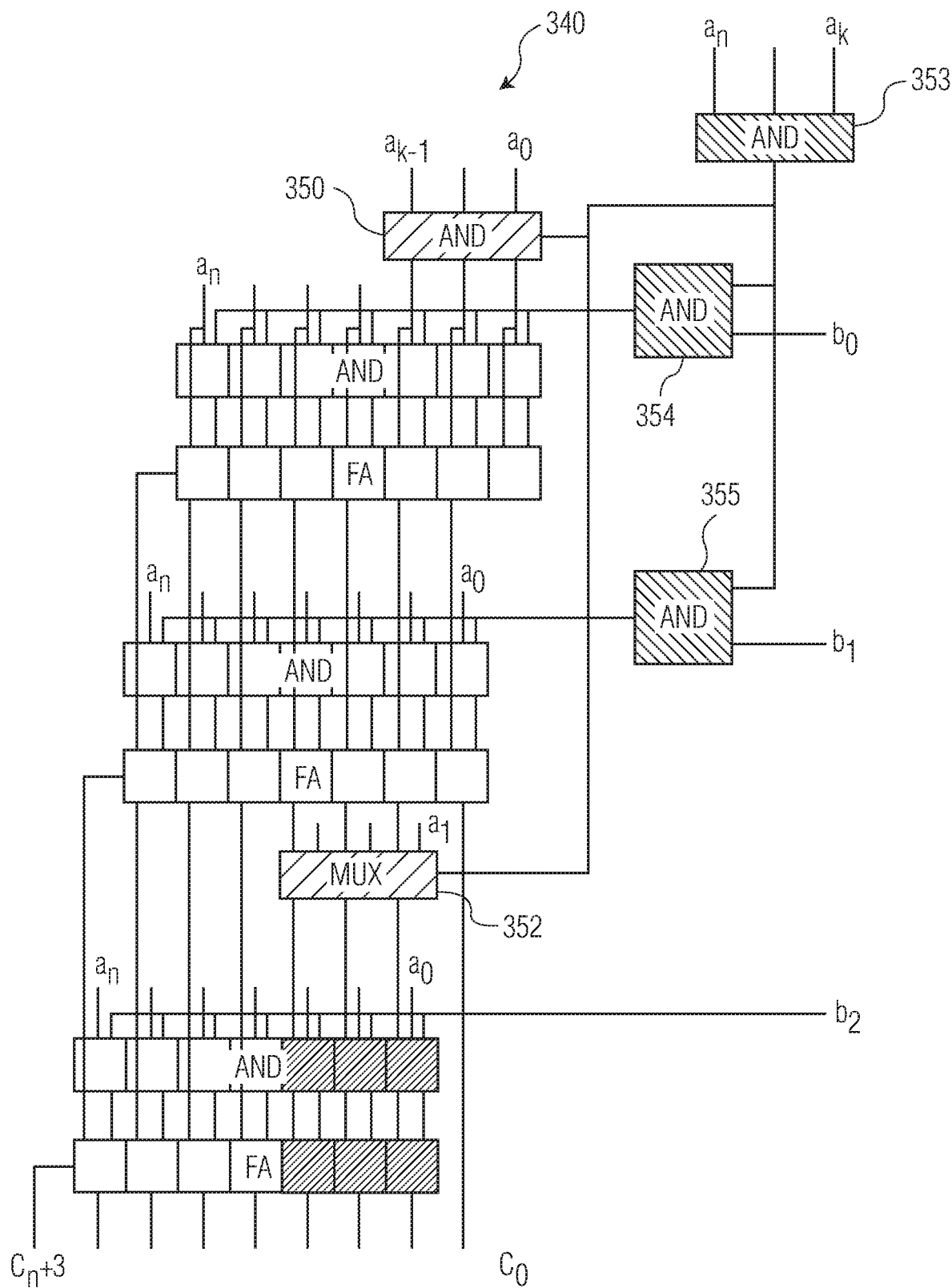

FIGS. 3A-3C illustrate example multiplication logic circuitry, in accordance with the present disclosure. In various embodiments, the multiplication logic circuit can include an array multiplier that performs multiplication operations on data represented in a SM form, which is herein referred to as a "SM array multiplier". In various embodiments, a portions of cells are active in the SM array multiplier when both operands a and b have a small magnitude. However, this situation does typically not occur in an FFT because the twiddle coefficients in an FFT are typically not small. The result of two n bits numbers a and b is a number c with an amplitude of at most 2-n bits. During computation of the FFT, the value of c is truncated (or rounded) to a number with only n bits in which only the msb's are maintained. This can guarantee a maximum absolute error.

As previously described, in various embodiments, an amplitude of one of the operands a is small and a portions of the cells of the SM array multiplier are used. For example, when the operand a is small, and the lsb's of b are set to zero. Various embodiments achieve use of a portion of the cells using the above described FFT processor circuitry and the logic thereof.

FIG. 3A illustrates internal logic of an example SM array multiplier, in accordance with various embodiments. The SM array multiplier 340 illustrated by FIG. 3A can be implemented as the logic of the multiplication logic circuitry 106, 224 of FIG. 1 and/or FIG. 2. In such an array multiplier 340, shifted versions of operand a are conditionally added together. FIG. 3B illustrates the active logic of the array multiplier array as previously illustrated by FIG. 3A when operand a is below a threshold, e.g., small, and the lsb bits $b_0$ and $b_1$ are set to zero.

FIG. 3C illustrates additional logic used to add the inputs of the full-adders (FA) of the SM array multiplier 340. As previously described, one row of FA is active because all inputs of the other FA are zero, some additional logic 350, 352 is added. This logic 350, 352 takes care that the zeros are fed into the inputs of the FA's in case the input operand a is small. Furthermore, this logic takes care that a shifted version of operand a is offered to the last row, or rows in general, of FA's of the multiplier. Further additional logic 353, 354, 355 detects that a is small and takes care that the lsb's of operand b are set to zero. While this additional logic 350, 352, 353, 354, 355 can cause additional power consumption in case the input operand a has a large magnitude, the overall power consumption of the multiplier is smaller if at least part of the time (e.g., most) of the time a is small. In other embodiments, as further described herein, an additional array multiplier can be used to perform multiplication operations when a is not small.

Figure 4:
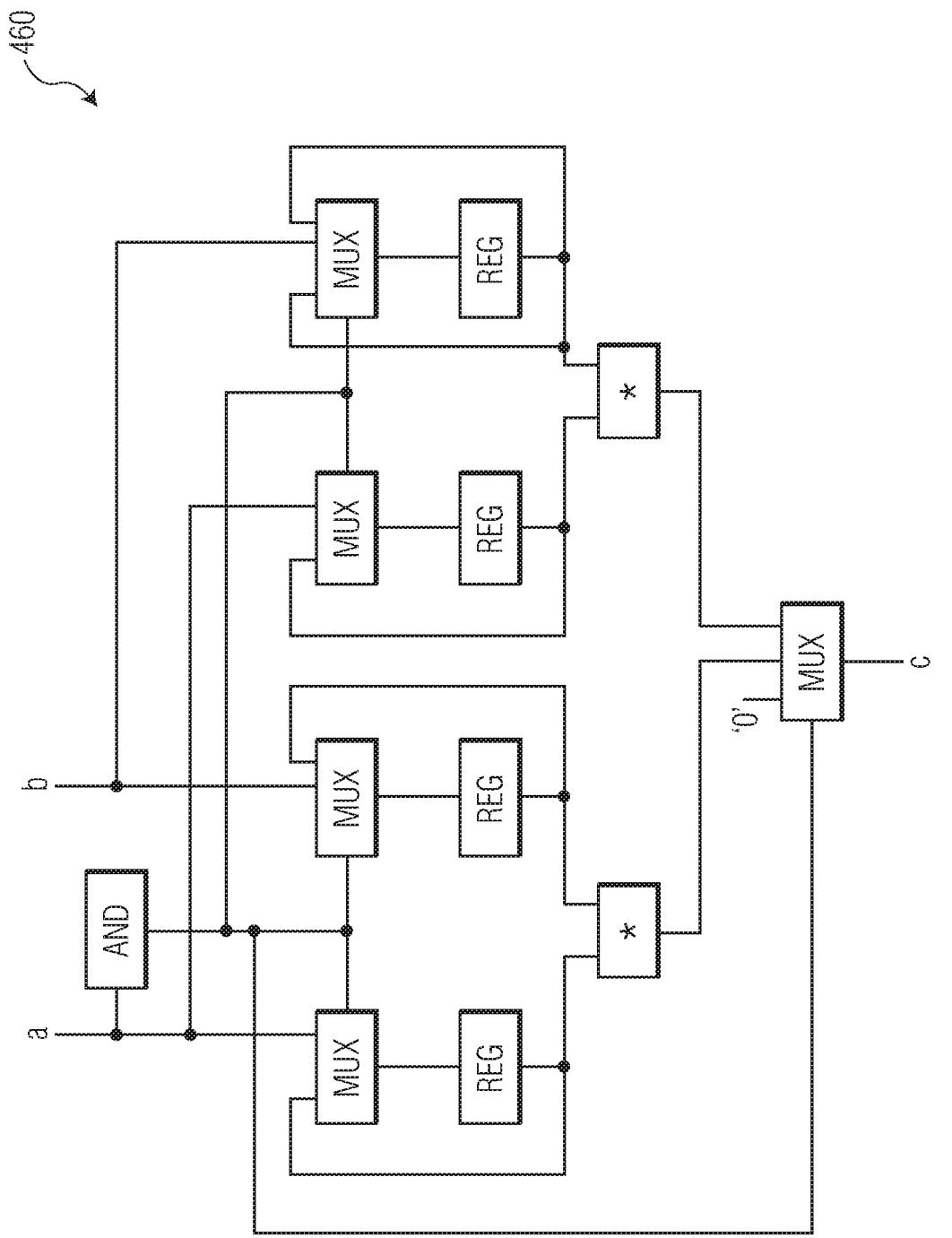
FIG. 4 illustrates other example multiplication logic circuitry, in accordance with the present disclosure.

FIG. 4 illustrates other example multiplication logic circuitry, in accordance with the present disclosure. As described above, various embodiments include the use of an additional multiplication logic circuitry. In such embodiments, one multiplier array is used for small numbers (e.g., data with an amplitude below a threshold) and another multiplier array is used for large numbers (e.g., data with an amplitude above a threshold), as illustrated by the multiplication logic circuitry 460 of FIG. 4. In this configuration, the inputs of one multiplier is kept constant when the other multiplier is used for the multiplication. This is different from setting bits to zero when a multiplier is not used, which may cause dynamic power-dissipation if the previous value was not zero. Such embodiments include the addition of registers in front of the multiplier arrays together with some multiplexers at the inputs and outputs of the multiplier arrays.

Such embodiments include the use of SM as number representations such that the msb's of operand a do not change most of the times if the numbers are typically small. Without making use of the SM representation, a sign extension logic is added in case the result of the small multiplier is negative. This can cost hardware. Furthermore, rounding logic is added to prevent a negative bias in the result of the multiplication. In such embodiments, power savings is achieved when a is small and b is large. To save power, the circuitry takes advantage of the fact that with a fixed point FFT, it suffices to keep the absolute truncation error constant. Therefore, the lsb's of b are set to zero and the multiplication logic uses its msb's during multiplication.

In various experimental embodiments, the functional correctness of the-above described apparatuses is evaluated for different input signals and no noticeable degradation in the signal-to-noise is detected. The reduction of the power-dissipation is evaluated by creating a hardware design of the FFT and using a gate-level power-simulator. A reduction of the power-dissipation in the combinatorial logic is up to a factor of 10. The factor depends on the input data as well as on the target clock frequency used. Specifically in FMCW radar signal processing, the power consumption of the integrated circuit can depend on the amplitude of the input digital stream. In programmable circuitry, the use of SM multipliers can result in the input range of multipliers being [−(2n−1), 2n−1]. And, the carry of lsb bits may not be computed.

Various variations can be made to the above-described apparatuses and FFT processor to improve power-efficiency and/or the maximum clock frequency at which the multiplier can run. One such variation includes performing the conversion of the first data from two's complement form to SM form directly after the operation that produces the input value for the multiplier, rather than at the input of the multiplier. By converting after the operation that produces the input value for the multiplier, the multiplier reads its inputs directly from a register, which can mitigate or remove any glitches in the input signals caused by the conversion-unit. Mitigating or removing glitches can increase power efficiency of the multiplier as compared to resolving the glitches. For example, converting at the input of the multiplier can half the power-efficiency of the multiplier as compared to converting after the operation that produces the input value for the multiplier.

Another variation includes the use of booth multipliers. The above described and illustrated embodiments include use multiplier arrays. Multiplier arrays can have a long delay path and therefore a low maximum clock frequency. In various embodiments, booth multipliers are used instead. With booth multipliers, even for positive input numbers, they generate internally negative numbers, e.g., equal to −1×a with a the input operand. As a results, all sign bits can toggle.

Figure 5:
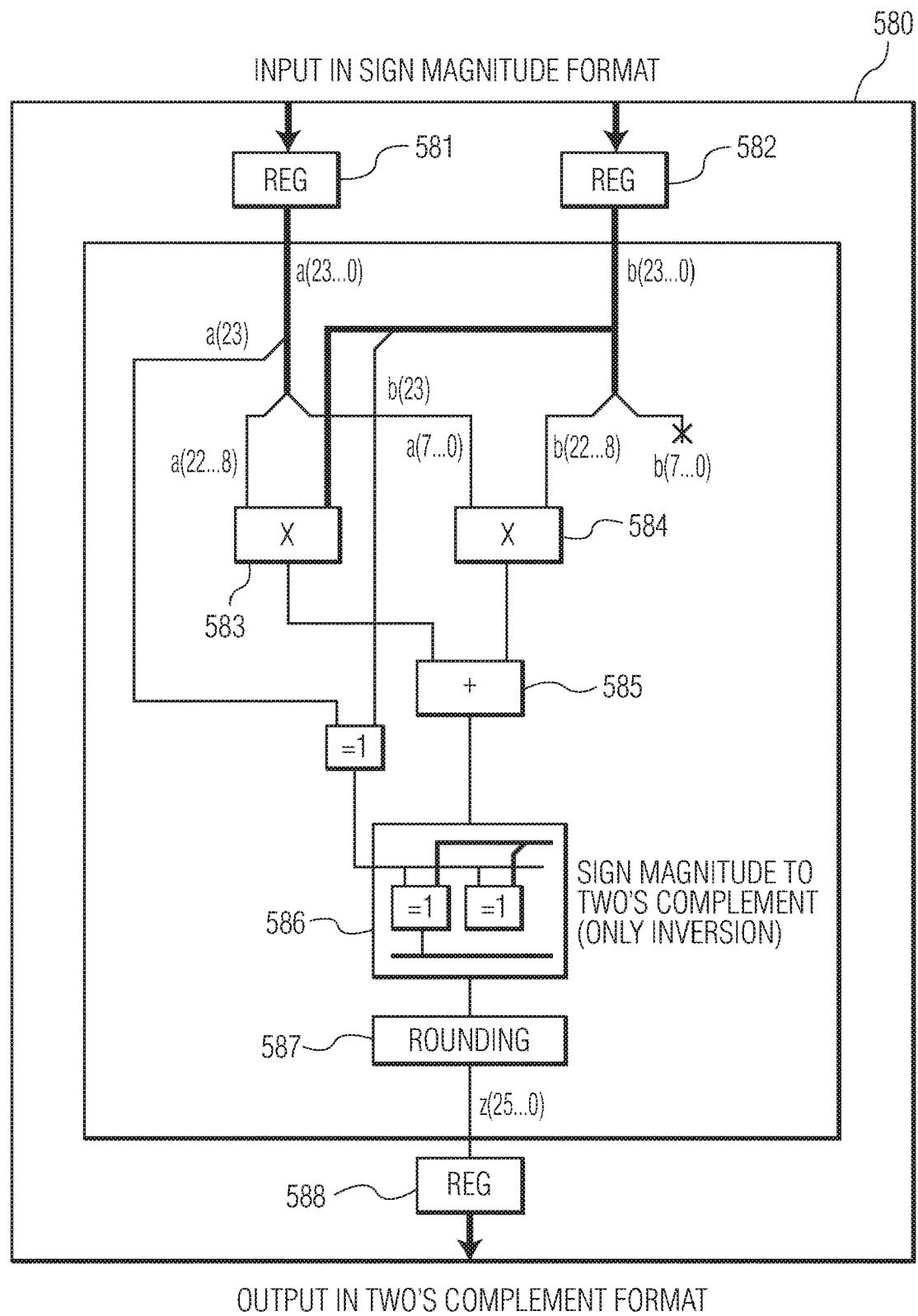
FIG. 5 illustrates other example multiplication logic circuitry, in accordance with the present disclosure.

FIG. 5 illustrates other example multiplication logic circuitry, in accordance with the present disclosure. The multiplication logic circuitry 580 includes two booth multipliers 583, 584. In such multiplication logic circuitry 580, the multiplication operations are split to the two booth multipliers 583, 584 and their outputs or results are added via adder (logic) circuitry 585. As shown, the inputs a and b are represented in SM form and the output is represented in two's complement form. As further illustrated, registers 581, 582 are in front of the booth multipliers 583, 584, and SM conversion circuitry 586 follows the adder (logic) circuitry 585 for converting the data from SM form to the two's complement form. A rounding block 587 selects bits from the multiplication results and another register 588 follows the rounding block 587.

In specific embodiments and for small numbers, the bits 22 to 8 of the a operand are typically zero. The booth multiplier 583 therefore also typically does not generate negative internal numbers because −1×0=0. Therefore, typically no transitions happen inside this booth multiplier 583 during so-called partial product addition. Experimental embodiments show that setting the input operand b to zero if a equals 0 did not save a lot of power during the a(23, 8)×b(24, 0) multiplication.

The split booth multiplier embodiments allows for exploiting the smaller input operands in filter and/or for FFT applications can allow for coefficients b that are quantized more coarsely. This can be achieved by setting the lsb's of input operand b to 0. This is equivalent to reducing the size of the second booth multiplier 584 from 8×24 into 8×16 bits. This is experimentally verified by applying the multiplier in an FFT application. The reduction of the b operand for the second multiplier 584 may not (or minimally does) affect the noise floor.

In various embodiments, the split into two booth multipliers 583, 584 can be generalized into more than two multipliers. It should also be noted that ranges of the input operand of a for the different booth multipliers 583, 584 can be selected differently. The same hold for the bit selected for the b operand of the second multiplier 584.

In such embodiments, as compared to use of the multiplication array, the FFT processor do not perform nulling of bits of operands nor selecting bits using multiplexers.

Figure 6:
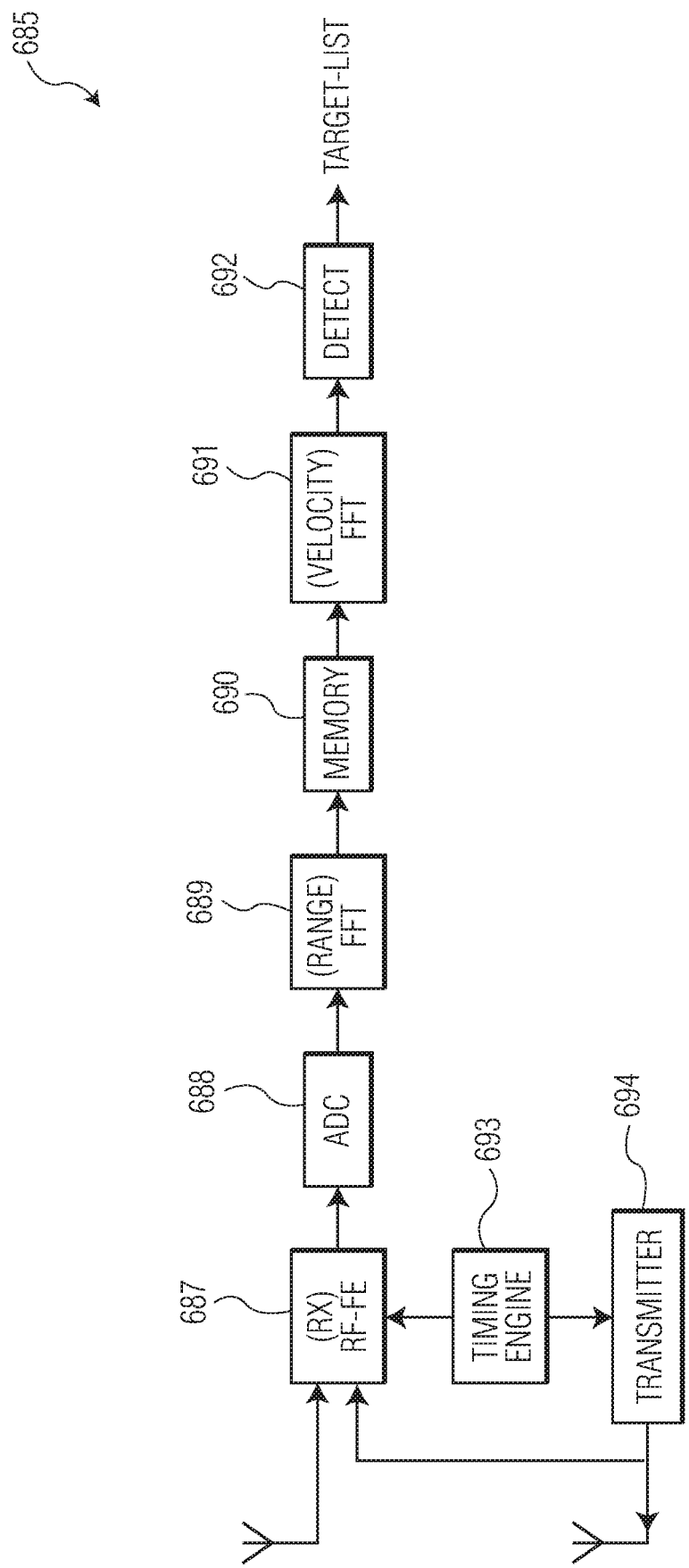
FIG. 6 illustrates example circuitry of an apparatus, in accordance with the present disclosure.

FIG. 6 illustrates example circuitry of an apparatus, in accordance with the present disclosure. More specifically, the circuitry illustrated includes an example FMCW radar system 685. The above described FFT processing and multiplication logic circuitries can be implemented in the illustrated (range) FFT 689 and/or (velocity) FFT 691 of the FMCW radar system 685. As previously described, during FMCW radar signal processing, most output bins of the so-called range FFT 689 contain noise with a low amplitude. As such, the results or outputs of the range FFT 689 are generally small. For the so-called velocity FFT 691, which takes as input the results of the range FFT 689, the FFT input is typically noise with a low amplitude.

The FMCW radar system 685 can operate as follows. The timing engine 693 generates a periodic start signal. After each start signal, the TX block 694 produces a frequency ramp, e.g., a sinusoidal wave signal with a linearly increasing frequency signal (a chirp) between e.g. 75 and 76 GHz. This signal is provided to the antenna and transmitted. The transmitted signal is reflected by the targets and picked up by the receive antenna after it is down-mixed in the receive front-end circuitry 687. Due to the fact that radio waves travel at the speed of light and the target is at a certain distance, there is a time delay between the signal transmitted and the one received. After mixing the received signal with the transmitted signal, the time delay results in a sinusoidal wave signal with a particular frequency. This signal is called the beat signal.

After sampling the beat signal by an ADC 688, it is further processed in the digital domain. The first step is computing an (range) FFT 689 on the samples of each chirp. The resulting FFT output contains peaks if targets are present at different distances (ranges). The results of a number (e.g., 256) of range FFTs are stored in rows a memory. After 256 range FFT results are stored in memory, the matrix with data in the memory 690 is transposed. After transposition, FFTs are additionally computed (velocity FFTs 691) over each row with 256 results. The results of the velocity FFTs 691 are again stored in memory 690. The resulting data matrix is called the range doppler map because it contains range and doppler information about the targets. The range doppler map is processed and the peaks are identified as targets at 692 and a target list is generated as output of the FMCW radar system 685. The FFT processing in accordance with various embodiments relates to the computation in the range FFT 689 and/or velocity FFT 691.

Figure 7:
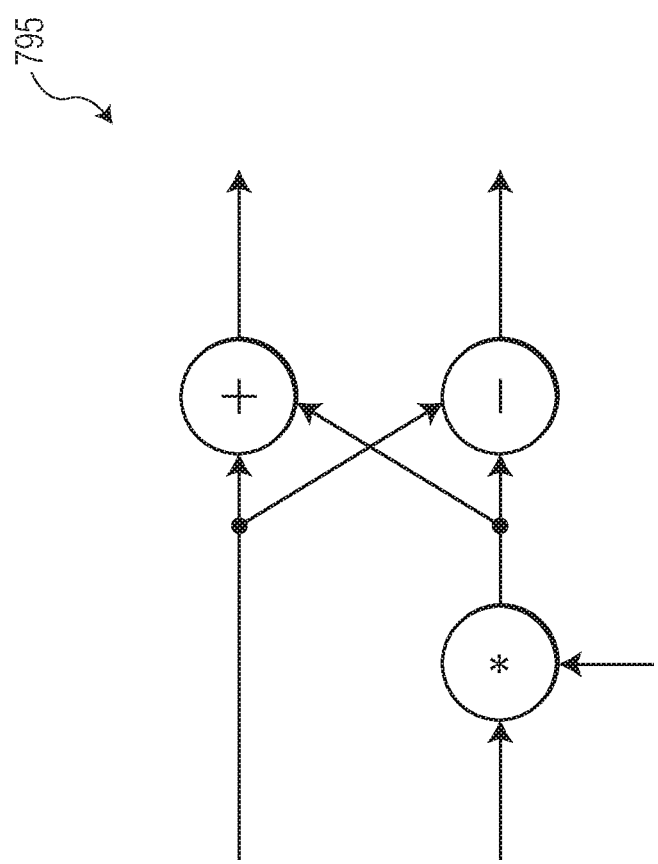
FIG. 7 illustrates an example FFT signal processor, in accordance with the present disclosure.

FIG. 7 illustrates an example FFT signal processor, in accordance with the present disclosure. In various embodiments, the FFT signal processor includes a complex multiplier having multiple internal multipliers. As illustrated, the FFT signal processor can include a radix-2 FFT butterfly. Additionally, various embodiments can include higher radix FFT butterflies. More specifically, FIG. 7 shows a decimation-in-time radix-2 butterfly. In such embodiments, all inputs are complex numbers and the multiplier is a complex multiplier that internally includes four real multipliers. Each I, Q pair in the complex number is represented as in two's complement form, with conversion to SM form occurring prior to, such as immediately before, the multipliers. Conversion from the SM form to the two's complement form can occur after, such as immediately after, each of the four multipliers in the complex multiplier. In various embodiments, other multiplication logic can be used inside the FFT signal processor in addition to or alternatively to the complex multiplier in the butterfly.

The above described apparatuses and circuitry can be used to perform a variety of methods. An example method includes receiving, by front-end circuitry of an apparatus, radar wave signals, and deriving, via a FFT signal processor, doppler information from the radar wave signals by operating on a digital stream of input data representing the radar wave signals. For example, doppler information is derived by performing multiplication operations, using multiplication logic circuit of the FFT signal processor, on first data in the digital stream while the first data is represented in a signed magnitude form, and performing other mathematical operations, using other logic circuitry of the FFT signal processor, on second data in the digital stream while the second data is represented in a two's complement form. Performing the multiplication operations includes using a multiplier array and/or a booth multiplier to perform the multiplication operations on the first data while the first data is represented in the signed magnitude form and adding together outputs from the multiplication operations. In various embodiments, the method further includes converting the first data from the two's complement form to the signed magnitude form and converting an output of the performed multiplication operations to the two's complement form. The conversion can occur at the input of the logic and/or after the input.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, converter and/or other circuit-type depictions (e.g., reference numerals 102 and 110 of FIG. 1 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 3A-3C, 4, and 5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the logic circuitry illustrated by FIGS. 3A-3C, 4, and 5 can be implemented as the multiplication logic circuitry in FIG. 1. As another example, the additional multiplication logic circuitry illustrated by FIG. 2 can be included in the FFT signal processor illustrated by FIG. 1. Such modifications do not depart from the true spirit and scope of various aspects of the disclosure, including aspects set forth in the claims.

What is claimed is:

1. An apparatus, comprising:
   front-end circuitry configured and arranged to receive radar wave signals; and
   a fast fourier transforms (FFT) signal processor, including multiplication logic circuitry and other logic circuitry, configured and arranged to derive doppler information from the radar wave signals by operating on a digital stream of input data representing the radar wave signals including:
   using the multiplication logic circuitry to perform multiplication operations on first data in the digital stream, selectively in response to amplitude information associated with the digital stream of input data, while the first data is represented in a signed magnitude form; and
   using the other logic circuitry to perform other mathematical operations on second data in the digital stream while the second data is represented in a two's complement form.

2. The apparatus of claim 1, wherein the FFT signal processor is configured and arranged to convert the first data between the two's complement form and the signed magnitude form, and the multiplication logic circuitry and the other logic circuitry are configured and arranged to optimize power consumption by at least ten percent relative to power consumption by the other logic circuitry when the other logic circuitry is performing the multiplication operations on the first data while the first data is represented in the two's complement form.

3. The apparatus of claim 1, wherein the multiplication logic circuitry includes:
   a two's complement converter circuit configured and arranged to selectively convert the first data in the digital stream from the two's complement form to the signed magnitude form; and
   multiplier logic configured to perform the multiplication operations on the first data while the first data is represented in the signed magnitude form.

4. The apparatus of claim 1, wherein the multiplication logic circuitry includes multiplication array circuitry, including a multiplier array, configured and arranged to perform the multiplication operations on the first data while the first data is represented in the signed magnitude form and to add together outputs from the multiplication operations.

5. The apparatus of claim 1, wherein the other logic circuitry is configured and arranged to perform addition operations on the second data while the second data is represented in the two's complement form and the multiplication logic circuitry includes two booth multiplier circuits configured and arranged to perform multiplication operations on the first data while the first data is represented in the signed magnitude form.

6. The apparatus of claim 1, wherein the multiplication logic circuitry further includes a signed magnitude converter circuit configured and arranged to convert output data from the multiplication operations from the signed magnitude form to the two's complement form.

7. The apparatus of claim 1, wherein the FFT signal processor includes at least two types of computation paths, and the multiplication logic circuitry is configured along one of the at least two types of computation paths and the other logic circuitry is configured along the other of the at least two types of computation paths, and power consumption of the FFT signal processor is dependent on an amplitude of the digital stream of input data.

8. The apparatus of claim 1, wherein the FFT signal processor is configured and arranged to determine an amplitude of the digital stream of input data is below a threshold and, in response, selectively provide the first data along a first of at least two types of computation paths associated with the multiplication logic circuitry and provide the second data along the second of the at least two types of computation paths associated with the other logic circuitry.

9. The apparatus of claim 1, wherein the FFT signal processor is configured and arranged to determine an amplitude of the digital stream of input data is above a threshold and, in response, selectively provide the second data along a second of at least two types of computation paths associated with the other logic circuitry and provide the first data along a third of the at least two types of computation paths associated with the other logic circuitry, wherein the multiplication logic circuitry is configured along a first of the at least two types of computation paths.

10. The apparatus of claim 9, wherein the other logic circuitry includes addition logic circuitry configured and arranged to perform addition operations on the second data while the second data is represented in the two's complement form and another multiplication logic circuitry configured and arranged to perform multiplication operations on the first data while the first data is represented in the two's complement form.

11. The apparatus of claim 1, wherein the front-end circuitry includes:
transceiver circuitry configured and arranged with an antenna to output signals and to receive the radar wave signals indicative of reflections from the output signals; and
signal processor, including an analog-to-digital converter (ADC), configured and arranged with the transceiver circuitry to mix the output signals with the radar wave signals and to generate the digital stream of input data from the mixture.

12. An apparatus comprising:
front-end circuitry configured and arranged to receive radar wave signals; and
a fast fourier transforms (FFT) signal processor, including multiplication logic circuitry and addition logic circuitry, configured and arranged to derive doppler information from the radar wave signals by operating on a digital stream of input data representing the radar wave signals including:
using the multiplication logic circuitry to perform multiplication operations on first data in the digital stream while the first data is represented in a signed magnitude form; and
using the addition logic circuitry to perform addition operations on second data in the digital stream selectively in response to amplitude information associated with the digital stream of input data, while the second data is represented in a two's complement form.

13. The apparatus of claim 12, wherein the multiplication logic circuitry further includes a signed magnitude converter circuit configured and arranged to convert output data from the multiplication operations from the signed magnitude form to the two's complement form.

14. The apparatus of claim 12, wherein the multiplication logic circuitry further includes multiplier logic configured to perform the multiplication operations on the first data while the first data is represented in the signed magnitude form and to add together outputs from the multiplication operations.

15. The apparatus of claim 12, wherein the multiplication logic circuitry further includes a two's complement converter circuit configured and arranged to selectively convert the first data in the digital stream from the two's complement form to the signed magnitude form.

16. The apparatus of claim 12, wherein the FFT signal processor further includes another multiplication logic circuitry configured and arranged to perform multiplication operations on the first data while the first data is represented in the two's complement form in response to the digital stream having an amplitude that is above a threshold.

17. The apparatus of claim 16, wherein the FFT signal processor is further configured and arranged to determine the amplitude of the digital stream and, in response, selectively provide the first data to one of the multiplication logic circuitry and the other multiplication logic circuitry based on the amplitude.

18. A method comprising:
receiving, by front-end circuitry of an apparatus, radar wave signals; and
deriving, via a fast fourier transforms (FFT) signal processor, doppler information from the radar wave signals by operating on a digital stream of input data representing the radar wave signals including:
performing multiplication operations, using multiplication logic circuit of the FFT signal processor, on first data in the digital stream selectively in response to amplitude information associated with the digital stream of input data, while the first data is represented in a signed magnitude form; and
performing other mathematical operations, using other logic circuitry of the FFT signal processor, on second data in the digital stream while the second data is represented in a two's complement form.

19. The method of claim 18, the method further including converting the first data from the two's complement form to the signed magnitude form and converting an output of the performed multiplication operations to the two's complement form.

20. The method of claim 18, wherein performing the multiplication operations includes using a booth multiplier to perform the multiplication operations on the first data while the first data is represented in the signed magnitude form and adding together outputs from the multiplication operations.

\* \* \* \* \*